United States Patent
Taki et al.

(10) Patent No.: US 11,306,465 B2
(45) Date of Patent: Apr. 19, 2022

(54) WATER SPOUT CONTROL DEVICE, WATER SPOUT CONTROL SYSTEM, AND WATER SPOUT CONTROL METHOD

(71) Applicant: LIXIL Corporation, Tokyo (JP)

(72) Inventors: Nobuhiro Taki, Tokyo (JP); Yuki Shirai, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 17/048,074

(22) PCT Filed: Mar. 8, 2019

(86) PCT No.: PCT/JP2019/009363
§ 371 (c)(1),
(2) Date: Oct. 15, 2020

(87) PCT Pub. No.: WO2019/202869
PCT Pub. Date: Oct. 24, 2019

(65) Prior Publication Data
US 2021/0164204 A1    Jun. 3, 2021

(30) Foreign Application Priority Data

Apr. 19, 2018    (JP) ............................. JP2018-080956

(51) Int. Cl.
*E03C 1/05*    (2006.01)
*G01V 8/20*    (2006.01)

(52) U.S. Cl.
CPC ................ *E03C 1/057* (2013.01); *G01V 8/20* (2013.01)

(58) Field of Classification Search
CPC ..................................................... E03C 1/057

USPC ....... 4/623, 302, 313, 668; 137/562; 239/16, 239/569; 251/131; 331/6; 340/591, 340/573.1; 361/173, 179
See application file for complete search history.

(56) References Cited

U.S. PATENT DOCUMENTS

2006/0231782 A1*  10/2006  Iott ........................... E03C 1/05

FOREIGN PATENT DOCUMENTS

| JP | 2001227016 A | * | 8/2001 | ............... E03C 1/05 |
| JP | 4676169 B2 | | 4/2011 | |
| JP | 2012-2033 A | | 1/2012 | |
| JP | 2015113604 A | * | 6/2015 | ............... E03C 1/05 |
| JP | 2016-41874 A | | 3/2016 | |

* cited by examiner

Primary Examiner — Lori L Baker
(74) Attorney, Agent, or Firm — Morrison & Foerster LLP

(57) ABSTRACT

Provided is a water spout control device that has a target object detector configured to: detect whether a target object exists in a first detection region and to determine a position of the target object when the target exists in the first detection region according to an image information of a regional image; a holding object detector configured to detect whether a holding object holding the detection target exists in a second detection region different from the first detection region and to determine a position of the holding object when the holding object exists in the second detection region; and a controller configured to control water discharging according to a detection result by the target object detector and a detection result by the holding object detector, wherein water spout conditions in the plurality of detection regions for controlling the water discharging from a faucet spout are different from each other.

6 Claims, 4 Drawing Sheets

WATER SPOUT CONTROL DEVICE, WATER SPOUT CONTROL SYSTEM, AND WATER SPOUT CONTROL METHOD

CROSS-REFERENCE TO RELATED APPLICATIONS

This application is a national stage application under 35 USC 371 of International Application No. PCT/JP2019/009363, filed Mar. 8, 2019, which claims the priority of Japanese Application No. 2018-080956, filed Apr. 19, 2018, the entire contents of each of which are incorporated herein by reference.

FIELD OF THE DISCLOSURE

The present disclosure relates to a water spout control device, a water spout control system, and a water spout control method.

BACKGROUND OF THE DISCLOSURE

In recent years, along with the development of a behavior recognition technology for recognizing an intention of a human behavior from the human behavior itself, development of a system configured to automatically and properly control a faucet even if the human does not operate the faucet according to intention of a human is expected.

For example, a technology of controlling water discharging by using a sensor, that is disposed at a faucet spout unit and has a detection region set in front of a flow line of water discharged from a faucet spout port, to detect existence of a reflection light generated from a detection target object by irradiating an irradiation light in an oblique direction with respect to a flow direction of the water discharged from the faucet spout port is developed (see Patent Document 1). According to the technology, even if in a case a transparent cup cannot be detected when the irradiation light from the sensor transmits through the transparent cup, it is possible to control the water discharging normally by detecting the reflection light from a hand holding the transparent cup.

Patent Document 1 Japanese Patent No. 4676169

SUMMARY OF THE DISCLOSURE

However, in a situation of utilizing the above described technology, since only the region in front of the faucet spout port is the detection region of the sensor, there is possibility that detection accuracy becomes low due to a usage situation.

The present disclosure is made in consideration of such circumstances, and an object is to provide a water spout control device, a water spout control system, and a water spout control method so as to control the water discharging from a faucet spout accurately.

According to some embodiments of the present disclosure, a water spout control device includes a target object detector configured to detect whether a target object as a detection target exists in a first detection region and determine a position of the target object in a case in which the target exists in the first detection region according to an image information of an regional image in which an imaging target region including a plurality of detection regions are captured, the first detection region being at least one region among the plurality of detection regions; a holding object detector configured to detect whether a holding object holding the detection target exists in a second detection region and determine a position of the holding object in a case in which the holding object exists in the second detection region according to the image information, the second detection region being different from the first detection region among the plurality of detection regions; and a controller configured to control water discharging according to a detection result by the target object detector and a detection result by the holding object detector; wherein water spout conditions in the plurality of detection regions for controlling the water discharging from a faucet spout are different from each other.

In the water spout control device according to some embodiments, the controller may control to perform the water discharging in a case in which the position of the target object is determined and a predetermined first water spout condition is satisfied, and the controller may control to perform the water discharging in a case in which the position of the holding object is determined and a second water spout condition is satisfied, the second water spout condition being stricter than the first water spout condition.

In the water spout control device according to some embodiments, the imaging target region may be a region including the faucet spout.

The water spout control device according to some embodiments, the second detection region may be set to be around the first detection region.

According to some embodiments of the present disclosure, a water spout control system includes an imaging device configured to capture an image of an imaging target region including a faucet spout from a upward side of the faucet spout, and a water spout control device according to any one of the embodiments is configured to acquire the image information of the image captured by the imaging device.

According to some embodiments of the present disclosure, a water spout control method includes a step of detecting whether a target object as a detection target exists in a first detection region and determining a position of the target object in a case in which the target exists in the first detection region by a target object detector according to an image information of an regional image in which a plurality of detection regions are captured, by a target object detector, the first detection region being at least one region among the plurality of detection regions; a step of detecting whether a holding object holding the detection target exists in a second detection region and determining a position of the holding object in a case in which the holding object exists in the second detection region according to the image information by a holding object detector, the second detection region being different from the first detection region among the plurality of detection regions; and a step of controlling water discharging according to a detection result by the target object detector and a detection result by the holding object detector by a controller.

According to the water spout control device, the water spout control system, and the water spout control method of some embodiments, there is possibility to control the water discharging from a faucet spout accurately.

DETAILED DESCRIPTION OF THE DISCLOSURE

Hereinafter, water spout control systems and water spout control devices according to each embodiment of the present disclosure will be described by referring to figures.

Figure 1:
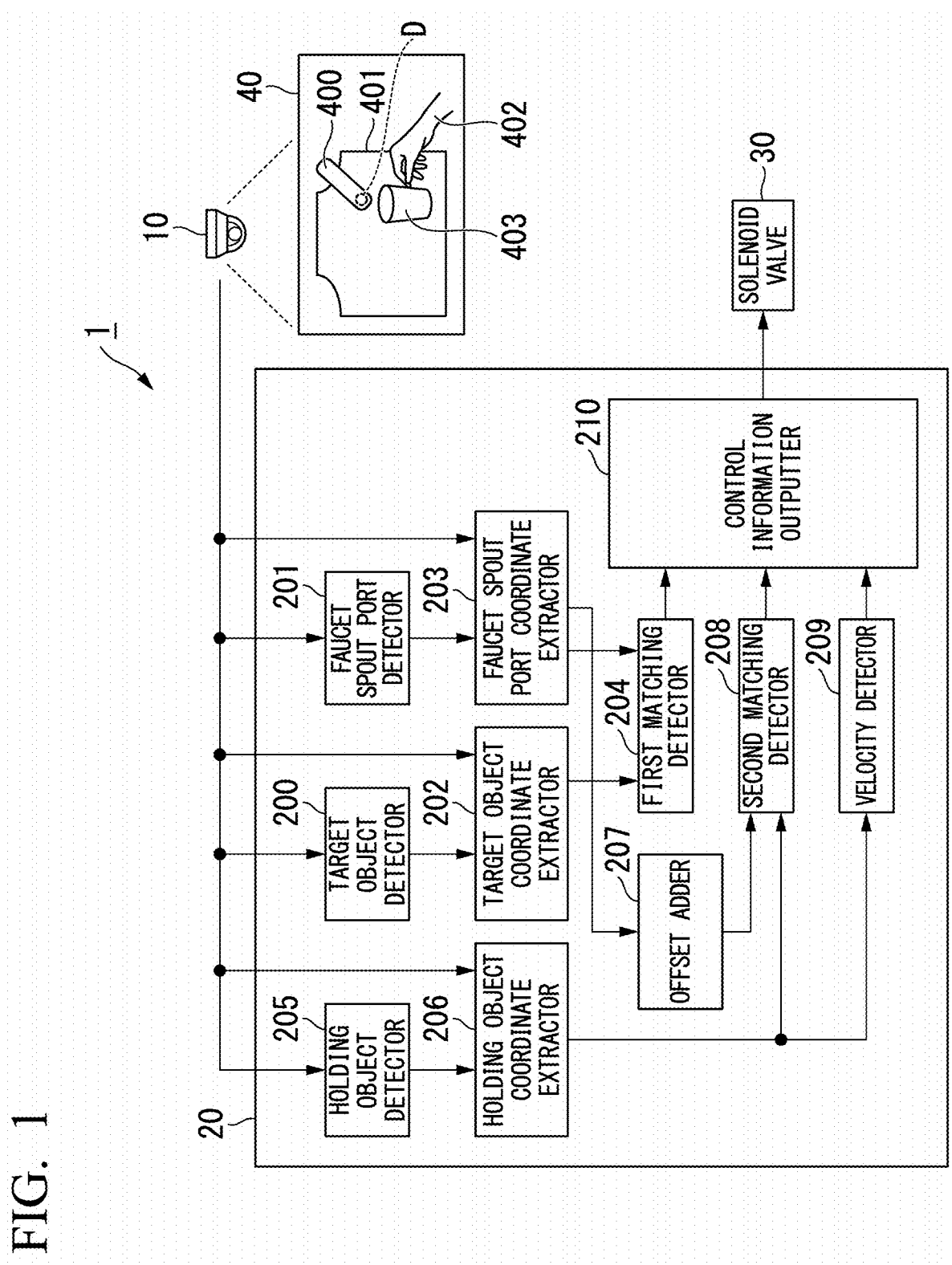
FIG. 1 is a block diagram showing a configuration example of a water spout control system 1 according to some embodiments.

FIG. 1 is a block diagram showing a configuration example of a water spout control system 1 according to some embodiments. The water spout control system 1 is configured to control water discharging according to an image of an imaging target region 40.

In the control of water discharging performed by the water spout control system, the control of selecting a type of the discharged water, a form of the discharged water, and a water pressure, a flow rate, a temperature and the like of the discharged water is included. In the types of the discharged water, for example, tap water, purified water, and hot water are included. In the forms of the discharged water, for example, a straight water flow or a shower water flow are included. In the description below, examples of cases in which the water spout control system 1 controls the water discharging and stops the water discharging will be described.

In the types of the discharged water, functional water such as hot purified water, carbonated water, sterilized water, alkaline ionized water, and the like may be included. In the forms of the discharged water, a temperature, a water pressure, and a water volume of the discharged water may be included.

The water spout control system 1, for example, includes an imaging device 10 and a water spout control device 20. The water spout control device 20 is connected to a solenoid valve 30 configured to make a faucet spout 400 start or finish discharging water. The water spout control system 1 is configured to control the water discharging and stop the water discharging of the faucet spout 400 by opening and closing the solenoid valve 30.

The imaging device 10 is disposed at a place such as a kitchen and the like where water is utilized and configured to capture an image of the imaging target region 40 by a predetermined time interval, for example. The image of the imaging target region 40 captured by the imaging device 10 is an example of "regional image". The imaging target region 40 is a region such as a worktop and the like where water equipment such as a sink 401 in which the faucet spout 400 is disposed. The imaging device 10, for example, captures an image of a broader region than that of the sink 401, i.e. a region including the sink 401 and a stove which is not shown in figures.

The imaging device 10, for example, is disposed on a ceiling of the kitchen, on an external lateral surface of a base plate of a wall cabinet, and the like. In a case when the imaging device 10 is disposed on the ceiling of the kitchen, a bulb type camera attachable to a luminaire wiring apparatus may be utilized. In this case, the imaging device 10 operates by power supplied from the luminaire wiring apparatus. In this case, the imaging device 10 may be disposed in the upward direction of the faucet spout 400. The imaging device 10, for example, captures a region including the faucet 400 so as to view down the faucet spout 400 from the upward direction of the faucet spout 400. In other words, the imaging device 10 captures the imaging target region 40 from the upward direction of the faucet spout 400.

The imaging device 10 outputs an image information of the captured image to the water spout control device 20. The imaging device 10 outputs the image information of the captured image to the water spout control device 20 via a wireless communication line such as a WiFi, for example. The imaging device 10 may capture a still image or a motion image. The imaging device 10 may capture a color image or a monochrome image.

The water spout control device 20, for example, has a target object detector 200, a faucet spout port detector 201, a target object coordinate extractor 202, a faucet spout port coordinate extractor 203, a first matching detector 204, a holding object detector 205, a holding object coordinate extractor 206, an offset adder 207, a second matching detector 208, a velocity detector 209, and a control information outputter 210. The target object detector 200 and the target object coordinate extractor 202 is an example of a "target object detector". The faucet spout port detector 201 and the faucet spout port coordinate extractor 203 is an example of a "faucet spout port detector". Each of the first matching detector 204, the second matching detector 208, the holding object detector 205, the offset adder 207, the velocity detector 209, and the control information outputter 210 is an example of a "controller".

The target object detector 200 detects whether a target object 403 exists in an image of the imaging target region 40 which is captured by the imaging device 10. The target object 403 refers to an object which may be a target of the water discharging, for example, a cup, a dish, a pot, a human hand, and the like.

The target object detector 200, for example, is configured to extract various objects captured in the image by performing an edge detection. The target object detector 200, for example, performs the edge detection according to a luminance difference in the image data. Specifically, the target object detector 200, applies various rectangle frames, in other words, various cells in the image, and then detects the luminance difference in the external circumference of the frame compared to that inside the frame. For example, in a case in which the luminance difference in the external circumference of the frame is small, the target object detector 200 determines that there is an object inside the frame and extracts the object from the image by extracting the frame.

The target object detector 200 selects a candidate of the target object 403 from the objects extracted from the image. The target object detector 200, for example, stores images of the target object 403 such as the cup, the dish and the like that are captured in various imaging conditions, for example imaging angle, illumination and the like, in a storage not shown in figures in advance. The target object detector 200, for example, sets the same scale for the image of the target object 403 stored in advance and the image of the object extracted from the image captured by the imaging device 10 and then compares the pixels in the two images. The target object detector 200, for example, determines that the object extracted from the image is the candidate of the target object 403 in a case when a tendency of color distribution per each pixel matches with each other at a degree equal to or more than a predetermined threshold.

The target object detector 200, in a case in which the object extracted from the image to be the candidate of the target object 403 exists in a region E1 including a faucet spout port D (see FIG. 2), determines the object as the target object 403. It is because that even if the object such as the cup or the like that may be the candidate of the target object 403 exists in the image, in a case in which the object exists in a region different from the region E1, in other words, at a position away from the faucet spout port D, it is difficult to consider discharging the water to the object. The region E1 including the faucet spout port D is an example of a "first detection region".

The target object detector 200 outputs a detection result to the target object coordinate extractor 202.

The faucet spout port detector 201 detects whether the faucet spout port D of the faucet spout 400 exists in the image according to the image of the imaging target region 40 captured by the imaging device 10.

The faucet spout port detector 201 is configured to extract various objects captured in the image, for example, by performing an edge detection. The faucet spout port detector 201 selects the faucet spout port D from the objects extracted from the image. The faucet spout port detector 201, for example, stores images of the faucet spout port D that are captured in various imaging conditions in a storage not shown in figures in advance. The faucet spout port detector 201 compares the stored images of the faucet spout port D and the image of the object extracted from the image captured by the imaging device 10, and the faucet spout port detector 201 determines that the object extracted from the image is the faucet spout port D in a case in which the two image satisfy a predetermined similarity condition. The faucet spout port detector 201 outputs a detection result to the faucet spout port coordinate extractor 203.

The target object coordinate extractor 202 extracts positional coordinates indicating the position of the target object 403 in the image according to the image captured by the imaging device 10 and the detection result output from the target object detector 200. The positional coordinate may be a coordinate value, in other words, representative value indicating a position in the vicinity of a center of the target object 403, and the positional coordinates may be coordinate groups indicating an outer edge of the target object 403. The target object coordinate extractor 202 outputs the extracted positional coordinates of the target object 403 in the extracted image to the first matching detector 204.

The faucet spout port coordinate extractor 203 extracts positional coordinates indicating a position of the faucet spout port D in the image according to the image captured by the imaging device 10 and the detection result output from the faucet spout port detector 201. The positional coordinates are coordinate groups indicating a region including the faucet spout port D.

The faucet spout port coordinate extractor 203 outputs the extracted positional coordinates of the faucet spout port D in the image to the first matching detector 204 and the offset adder 207.

The first matching detector 204 determines whether the position of the target object 403 extracted from the target object coordinate extractor 202 and the position of the region E1 including the faucet spout port D extracted from the faucet spout port coordinate extractor 203 match with each other. The first matching detector 204, for example, determines that both of the positions match with each other in a case in which the positional coordinates of the target object 403 are included in the region E1 including the faucet spout port D. The first matching detector 204 outputs the detection result to the control information outputter 210.

The holding object detector 205 detects whether a holding object 402 exists in the image according to the image of the imaging target region 40 captured by the imaging device 10. The holding object 402 is an object for holding the target object 403 that receives the water discharged at a downward side of the faucet spout port D, for example, the holding object 402 is a human hand, chopsticks, tongs and the like for holding a cup, a dish, vegetables and the like that are put out to the faucet spout port.

The holding object detector 205, for example, determines an object as the holding object 402 only in a case in which a human exists in the image and the object holding the target object 403 exists in a region E2 (see FIG. 2) surrounding the region E1 including the faucet spout port D. It is because that in a case in which the human does not exist in the image, it is not assumed to perform the water discharging. The holding object detector 205 does not determine an object as the holding object 402 even if the object existing in a region different from the region E2, in other words, in a region away from the faucet spout port D holds the target object 403, since it is difficult to consider that the target object 403 being held receives the discharged water. The region E2 is an example of a "second detection region".

It is preferable that the holding object detector 205 does not detect an object which only exists in the region E2 and not utilized by the human as the holding object 402. Even if in a state in which the object existing in the region E2 is holding the target object 403, if the human does not exist in the image, it is difficult to consider that the target object 403 is held for receiving the discharged water.

It is preferable that the holding object detector 205 detects the chopsticks as the holding object 402, for example, in a case in which the human uses the chopsticks to hold the target object 403 such as the vegetables and the like, and at least part of the chopsticks exist in the region E2. The holding object detector 205 does not detect the chopsticks and the like as the holding object 402 in a case in which the chopsticks that are not held by the human occasionally exists in the region E2 in a state of holding the target object 403.

The holding object detector 205, for example, is configured to extract various objects captured in the image by performing an edge detection. The holding object detector 205 selects the holding object 402 from the objects extracted from the image. The holding object detector 205, for example, stores images of the holding object 402 having various shapes that are captured in various imaging conditions in a storage not shown in figures in advance. The holding object detector 205 compares the stored images of the holding object 402 with the image of the object extracted from the image captured by the imaging device 10, and the holding object detector 205 determines that the object extracted from the image is the holding object 402 in a case in which the two images satisfy a predetermined similarity condition. The holding object detector 205 outputs a detection result to the holding object coordinate extractor 206.

The holding object coordinate extractor 206 extracts positional coordinates indicating a position of the holding object 402 in the image according to the image captured by the imaging device 10 and the detection result output by the holding object detector 205. The positional coordinates may be a coordinate value, in other words, representative value indicating a position in the vicinity of a center of the holding object 402, and the positional coordinates may be coordinate groups indicating the outer edge of the holding object 402. The holding object coordinate extractor 206 outputs the positional coordinates of the holding object 402 in the extracted image to the second matching detector 208 and the velocity detector 209.

The offset adder 207 adds a predetermined offset to the positional coordinates indicating the position of the faucet spout port D that are extracted from the faucet spout port coordinate extractor 203. As described, the positional coordinates indicating the position of the faucet spout port D are groups indicating the region E1 including the faucet spout port D. The region E1 is a region at a downward side of the faucet spout port D since the region E1 is a region where the target object 403 receiving the discharged water exists. The offset adder 207 adds a predetermined offset in a direction from a central portion of the faucet spout port D toward an outer circumference of the faucet spout port D to each of the coordinates in the coordinate groups indicating the outer circumference of the region E1. The offset adder 207 generates coordinate groups indicating an outer circumference of an offset region, i.e. the region E2 surrounding the region E1 in the horizontal direction.

The offset adder 207 outputs the generated positional coordinates to the second matching detector 208.

The second matching detector 208 determines whether the positional coordinates of the holding object 402 that are extracted from the holding object coordinate extractor 206 and the position of the region E2 as the offset region extracted by the offset adder 207 match with each other. The second matching detector 208 determines that the positional coordinates of the holding object 402 and the position of the region E2 match with each other in a case, for example, the positional coordinates of the holding object 402 is included in the region E2 as the offset region. The second matching detector 208 outputs a detection result to the control information outputter 210.

The velocity detector 209 detects a movement velocity of the holding object 402 according to the positional coordinates of the holding object 402 extracted by the holding object coordinate extractor 206. The velocity detector 209 calculates a movement amount per unit time, in other words, a velocity at the position of the holding object 402 according to the positional coordinates of the holding object 402 in a first image and the positional coordinates of the holding object 402 in a second image captured before the first image. The velocity detector 209 outputs the calculated velocity to the control information outputter 210.

The control information outputter 210 outputs a control signal for controlling an open-close state of the solenoid valve 30 according to the detection result of the first matching detector 204, the detection result of the second matching detector 208, and the detection result of the velocity detector 209. Hereinafter, process performed by the control information outputter 210 will be described using FIG. 2.

Figure 2:
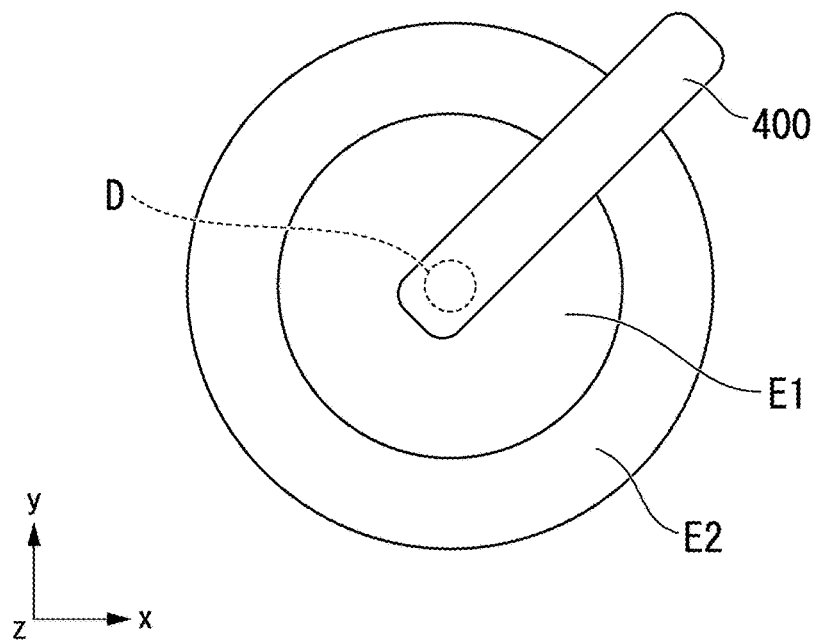
FIG. 2 is a view showing process performed by a control information outputter 210 according to some embodiments.

FIG. 2 is a view for describing the process performed by the control information outputter 210 according to some embodiments. In FIG. 2, a schematic view in a case of imaging the faucet spout 400 from the upward side is shown, the faucet spout port D is disposed at one end of the faucet spout 400, and the region E1 and the region E2 having a center at the faucet spout port D as are shown.

The control information outputter 210, for example, sets up a plurality of detection regions in accordance with the position of the faucet spout port D. In this example, the case in which the control information outputter 210 sets up the region E1 and the region E2 is shown.

The control information outputter 210, for example, determines whether the following water spout conditions are satisfied in accordance with each position of the target object 403 and the holding object 402.

Water spout condition 1: the target object 403 exists in the region E1 corresponding to the position of the faucet spout port D.

Water spout condition 2: the holding object 402 exists in the region E2 corresponding to the offset position.

In this case, the control information outputter 210 may determine whether the target object 403 such as the cup, the dish and the like are put out to the faucet spout port D by determining whether the water spout condition 1 is satisfied. Accordingly, the control information outputter 210 may control to perform the water discharging in the case in which the target object 403 such as the cup, the dish and the like are put out to the faucet spout port D, and may control to not perform the water discharging in the case in which the target object 403 such as the cup, the dish and the like is not put out to the faucet spout port D.

The control information outputter 210 may determine whether the holding object 402 such as a human hand holding a cup exists at a position slightly away from the faucet spout port D by determining whether the water spout condition 2 is satisfied. Accordingly, the control information outputter 210 may control to perform the water discharging in the case in which it is determined that there is a human hand holding a cup at a position slightly away from the faucet spout port D, and may control to not perform the water discharging in the case in which the holding object 402 such as the human hand does not exist at a position slightly away from the faucet spout port D.

The control information outputter 210 may detect that the target object 403 is put out to the downward position of the faucet spout port D with a high accuracy by determining the water spout condition 2 in addition to the water spout condition 1. For example, in a case in which a transparent cup is put out to the downward position of the faucet spout port D, it is considerable that a shape of the cup is not clearly captured in the image. In this case, the target object detector 200 cannot detect the target object 403 from the image. In this case, though the target object 403 is not detected, the holding object 402 is detected by setting up the water spout condition 2, thereby the control information outputter 210 may assume that the target object 403, i.e. the transparent cup is put out to the faucet spout port D and the control information outputter 210 may control the water discharging.

The control information outputter 210 may be configured to determine, for example, whether the following water spout conditions are satisfied in accordance with an existence period of the target object 403 in the region E1, and an existence period of the holding object 402 in the region E2.

Water spout condition 3: the existence period of the target object 403 in the region E1 is equal to or more than a predetermined threshold.

Water spout condition 4: the existence period of the holding object 402 in the region E2 is equal to or more than a predetermined threshold.

The control information outputter 210 may specify the case in which the target object 403 occasionally enters the region E1 and the case in which the target object 403 is put out to the region E1, in other words to the faucet spout port D for receiving the discharged water by determining whether the water spout condition 3 is satisfied. Accordingly, the control information outputter 210 may control to not perform the water discharging in the case in which the target object 403 occasionally enters the region E1, and the control information outputter 210 may control to perform the water discharging in the case in which the target object 403 is put out to the region E1, in other words to the faucet spout port D for receiving the discharged water.

The control information outputter 210 may specify the case in which the holding object 402 occasionally enters the region E2 and the case in which the holding object 402 remains in the region E2 to perform the water discharging from the faucet spout port D by determining whether the water spout condition 4 is satisfied. Accordingly, the control information outputter 210 may control to not perform the water discharging in the case in which the holding object 402 occasionally enters the region E2, and the control information outputter 210 may control to perform the water discharging in the case in which the holding object 402 remains in the region E2 to perform the water discharging from the faucet spout port D.

The control information outputter 210 may set the threshold of the existence period in the water spout condition 3 and the threshold of the existence period in the water spout condition 4 to be the same threshold value, or different threshold values. The control information outputter 210, for example, may set the threshold of the existence period in the water spout condition 3 to be shorter than the threshold of the existence period in the water spout condition 4. For example, the control information outputter 210 may control to start the water discharging in the case in which the target object 403 remains in the region E1 for a relatively short period, and the control information outputter 210 may control to start the water discharging in a case in which the holding object 402 remains in the region E2 for a relatively long period even if the target object 403 is not detected.

In the case in which the threshold of the existence period in the water spout condition 3 and the threshold of the existence period in the water spout condition 4 are different, a condition controlled by the control information outputter 210 to start the water discharging if the target object 403 remains in the region E1 is different from a condition controlled by the control information outputter 210 to start the water discharging if the holding object 402 remains in the region E2. In other words, the region E1 and the region E2 are examples of "a plurality detection regions where water spout conditions are different".

In a case in which the threshold of existence period in the water spout condition 4 is longer than the threshold of existence period in the water spout condition 3, the condition controlled by the control information outputter 210 to start the water discharging in the case in which the holding object 402 remains in the region E2 is stricter than the condition controlled by the control information outputter 210 to start the water discharging in the case in which the target object 403 remains in the region E1. The phrase "the condition controlled by the control information outputter 210 to start the water discharging is stricter" means that a period from the object being detected until the water discharging starts is longer. In other words, in this case, the water spout condition 3 is an example of "a first water spout condition", and the water spout condition 4 is an example of "a second water spout condition".

Differences between the water spout conditions controlled by the control information outputter 210 to start the water discharging in the region E1 and the region E2 are not limited to the period when the object remains in the corresponding region. For example, differences between the water spout conditions of the region E1 and the region E2 may be determined by taking differences of the areas of the region E1 and the region E2, operations of human to make the target object 403 to receive the discharged water and the like into comprehensive consideration.

For example, with regard to the operations of the human to cause the target object 403 to enter the region E1, detections experiments are performed by various humans such as adult men, adult women, children, elderly humans and the like for multiple times, for example, one hundred times, while changing detection conditions such as areas of the region E1 and the region E2, the existence period of the object in the corresponding region E1 and the region E2. According to results of the detection experiments, the water spout condition in the case in which the target object 403 remains in the region E1 and the water spout condition in the case in which the holding object 402 remains in the region E2 may be determined. In this case, a detection condition having a higher possibility for the target object 403 to be detected in the region E1 is determined as the water spout condition in the case in which the object target 403 remains in the region E1. A detection condition having a lower possibility for the holding object 402 to be detected in the region E2 is determined as the water spout condition in the case in which the holding object 402 remains in the region E2. Accordingly, the condition controlled by the control information outputter 210 to start the water discharging in the case in which the holding object 402 remains in the region E2 is set to be stricter than the condition controlled by the control information outputter 210 to start the water discharging in the case in which the target object 403 remains in the region E1.

The control information outputter 210, for example, may determine whether the following water spout condition is satisfied in accordance with the velocity of the holding object 402 in the region E2.

Water spout condition 5: the movement velocity of the holding object 402 in the case of existing in the region E2 is smaller than a predetermined threshold.

In this case, the control information outputter 210 may determine whether the holding object 402 is simply passing through the region E2, or the holding object 402 is going to stop in a state in which the cup held by the holding object 402 is put out to the faucet spout port D by determining whether the water spout condition 5 is satisfied. Accordingly, the control information outputter 210 may control to not perform the water discharging in the case in which the holding object 402 is simply passing through the region E2, and the control information outputter 210 may control to perform the water discharging in the case in which the holding object 402 is going to stop in a state in which the cup held by the holding object 402 is put out to the faucet spout port D.

Figure 3:
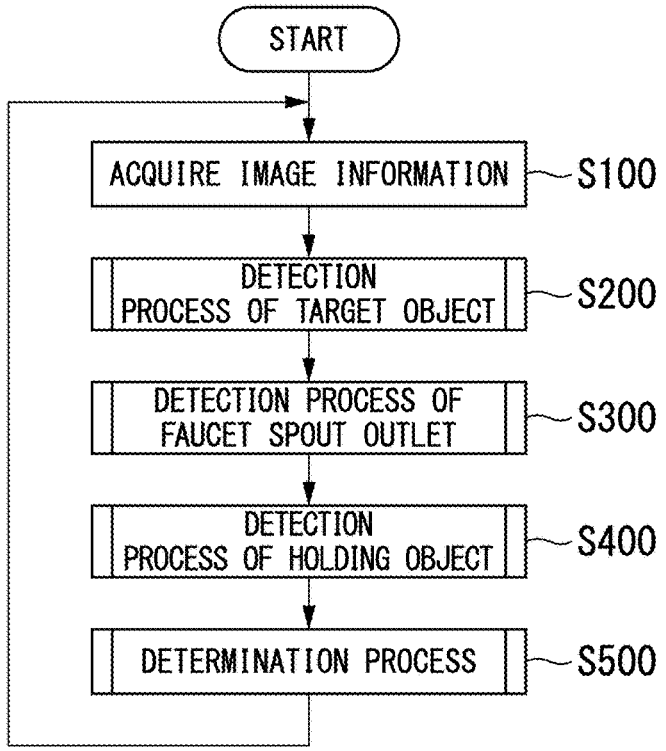
FIG. 3 is a flowchart showing an operation example of a water spout control device 20 according to some embodiments.

FIG. 3 is a flow chart showing an operation example of a water spout control device 20 according to some embodiments. General flow of operations of the water spout control device 20 will be described using FIG. 3.

At first, the water spout control device 20 acquires an image information of an image of the imaging target region 40 which is captured by the imaging device 10 (Step S100 in FIG. 3). The water spout control device 20 outputs the acquired image information to the target object detector 200, the faucet spout port detector 201, and the holding object detector 205.

Subsequently, the target object detector 200 performs process of detecting whether the target object 403 is included in the image, in other words the detection process of the target object (Step S200 in FIG. 3). The target object detector 200 outputs the detection result to the target object coordinate extractor 202. The target object coordinate extractor 202 extracts the positional coordinates of the target object 403 according to the detection result output by the target object detector 200 and outputs the extracted positional coordinates to the first matching detector 204.

Subsequently, the faucet spout port detector 201 performs process of detecting whether the faucet spout port D is included in the image, in other words the detection process of the faucet spout port D (Step S300 in FIG. 3). The faucet spout port detector 201 outputs the detection result to the faucet spout port coordinate extractor 203. The faucet spout port coordinate extractor 203 extracts the positional coordinates according to the detection result output by the faucet spout port detector 201, and the faucet spout port coordinate extractor 203 outputs the extracted positional coordinates to the first matching detector 204 and the offset adder 207.

Subsequently, the holding object detector 205 performs process of detecting whether the holding object 402 is included in the image, in other words the detection process of the holding object (Step S400 in FIG. 3). The holding object detector 205 outputs a detection result to the holding object coordinate extractor 206. The holding object coordinate extractor 206 extracts the positional coordinates of the holding object 402 according to the detection result output by the holding object detector 205, and the holding object coordinate extractor 206 outputs the extracted positional coordinates to the second matching detector 208 and the velocity detector 209.

Next, the water spout control device 20 performs process of determining whether to perform the water discharging, in other words the determination process (Step S500 in FIG. 3).

In the flow chart shown in FIG. 3, the example of performing the process in a sequence of the detection process of the target object (Step S200 in FIG. 3), the detection process of the faucet spout port (Step S300), and the detection process of the holding object (Step S400) is described, the process showing in Step S200, Step S300, and Step S400 may be swapped.

Figure 4:
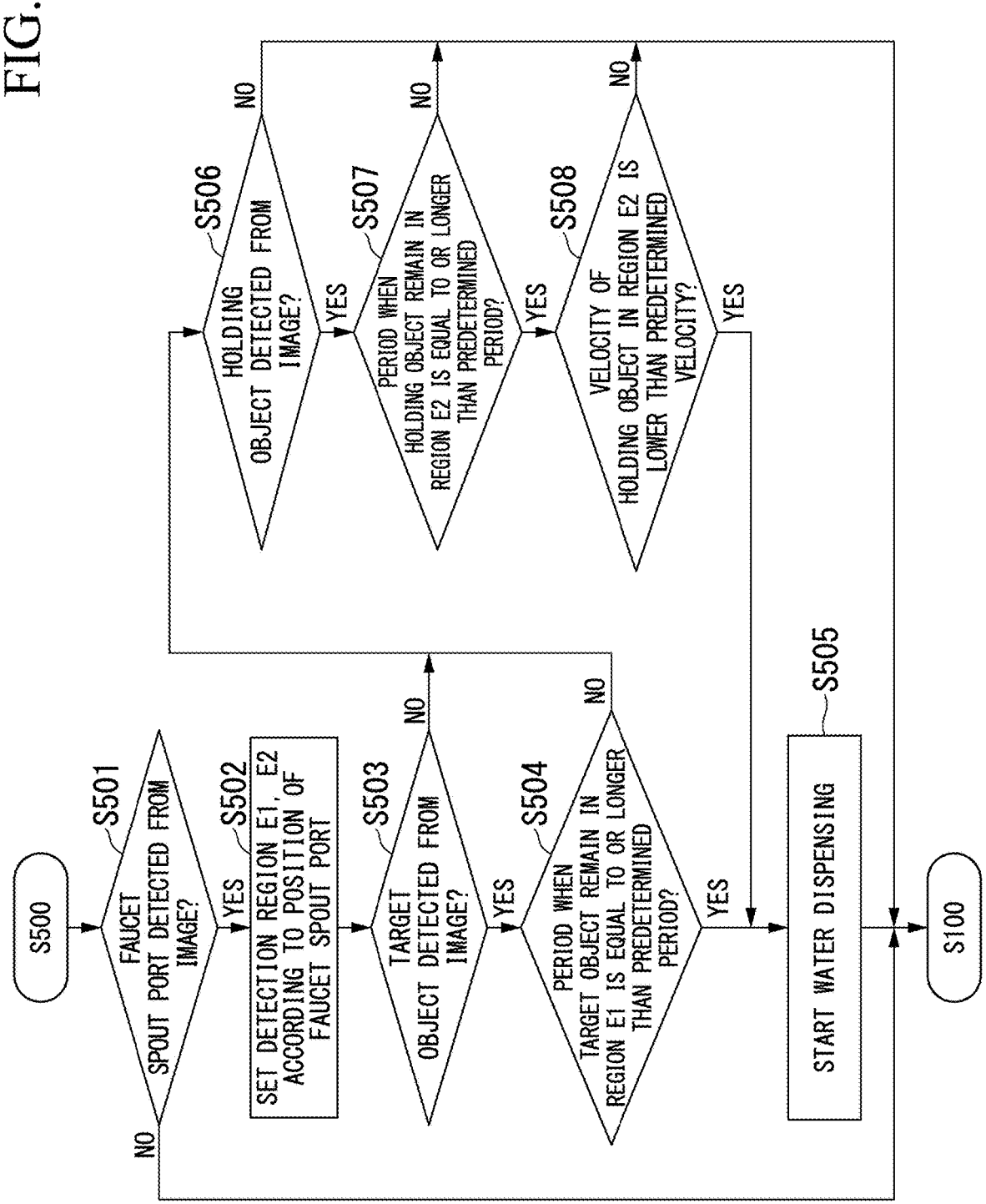
FIG. 4 is a flowchart showing an operation example of the water spout control device 20 according to some embodiments.

FIG. 4 is a flow chart showing an operation example of the water spout control device 20 according to some embodiments. Hereinafter, a general flow of the "determination process" shown in Step S500 in FIG. 3 will be described by using FIG. 4.

At first, the control information outputter 210 determines whether the faucet spout port D is detected from the image by the faucet spout port coordinate extractor 203 (Step S501 in FIG. 4).

Subsequently, the control information outputter 210 sets the region E1 and the region E2 as the detection region according to the position of the faucet spout port D in the case in which the faucet spout port D is detected from the image (Step S502 in FIG. 4).

Subsequently, the control information outputter 210 determines whether the target object 403 is detected from the image by the target object coordinate extractor 202 (Step S503 in FIG. 4).

Subsequently, the control information outputter 210 determines whether the existence period when the target object 403 remains in the region E1 is equal to or longer than a predetermined period in the case in which the target object 403 is detected (Step S504 in FIG. 4).

Next, the control information outputter 210 start the water discharging in the case in which the existence period when the target object 403 remains in the region E1 is equal to or longer than the predetermined period (Step S505 in FIG. 4).

In a case in which the target object 403 is not detected from the image in Step S503, and in a case in which the existence period when the target object 403 remains in the region E1 is less than the predetermined period in Step S504, the control information outputter 210 determines whether the holding object 402 is detected from the image by the holding object coordinate extractor 206 (Step S506 in FIG. 4).

Subsequently, in a case in which the holding object 402 is detected, the control information outputter 210 determines whether the existence period when the holding object 402 remains in the region E2 is equal to or longer than a predetermined period (Step S507 in FIG. 4).

Subsequently, in a case in which the existence period when the holding object 402 remains in the region E2 is equal to or longer than a predetermined period, the control information outputter 210 determines whether a velocity of the holding object 402 during the period when the holding object 402 remains in the region E2 is smaller than a predetermined velocity, in other words a threshold (Step S508 in FIG. 4).

Next, the control information outputter 210 controls to start the water discharging in a case in which the existence period when the holding object 402 remains in the region E2 is equal to or longer than a predetermined period, and the velocity of the holding object 402 during the period is smaller than the predetermined velocity (Step S505 in FIG. 4).

In a case in which the faucet spout port D is not detected from the image during the process shown in Step S501, in a case in which the holding object 402 is not detected from the image during the process shown in Step S506, in a case in which the existence period when the holding object 402 remains in the region E2 is less than the predetermined period during the process shown in Step S507, and in a case in which the velocity of the holding object 402 during the period when the holding object 402 remains in the region E2 is not smaller than the predetermined velocity during the process shown in Step S508, the control information outputter 210 does not control to start the water discharging and returns to the process shown in Step S100.

In the description above, an example is described that the control information outputter 210 controls to start the water discharging shown in Step S505 in a case in which conditions of detection process shown in both of Step S507 and Step S508 are satisfied, more specifically, in the case in which it is determined to be "YES" in Step S507, in other words the existence period when the holding object 402 remains in the region E2 is equal to or longer than the predetermined period, and it is determined to be "YES" in Step S508, in other words the velocity of the holding object 402 during the period when the holding object 402 remains in the region E2 is smaller than the predetermined velocity, the present disclosure is not limited thereto. For example, in a case in which only the process shown in Step S507 is satisfied, more specifically, in the case in which it is determined to be "YES" in Step S507, in other words the existence period when the holding object 402 remains in the region E2 is equal to or longer than the predetermined period, the control information outputter 210 may proceed to Step S505 so as to control to start the water discharging.

As described above, the water spout control device 20 according to some embodiments has the target object detector 200 and the target object coordinate extractor 202, the holding object detector 205 and the holding object coordinate extractor 206, and the control information outputter 210. The target object detector 200 and the target object coordinate extractor 202 detects whether the target object 403 as the detection target exists in the region E1 as at least one detection region among the plurality detection regions according to the image information of the regional image in which the imaging target region including the plurality detection regions, i.e. the region E1 and the region E2, and the target object detector 200 and the target object coordinate extractor 202 determines the position of the target object 403 in the case in which the target object 403 exists in the region E1. The holding object detector 205 and the holding object coordinate extractor 206 detects whether the holding object 402 holding the target object 403 exists in the region E2 different from the region E1 among the plurality of detection regions according to the image information, and the holding object detector 205 and the holding object coordinate extractor 206 determines the position of the holding object 402 in the case in which the holding object 402 exists in the region E2. The control information outputter 210 controls the water discharging according to the detection result by the target object detector 200 and the target object coordinate extractor 202, and the detection result by the holding object detector 205 and the holding object coordinate extractor 206.

Accordingly, even if in the case in which the target object 403 cannot be detected in spite of putting the target object 403 out to the faucet spout port D, the water spout control device 20 according to some embodiments may indirectly detect the target object 403 by detecting the holding object 402 such that the water spout control device 20 may control the water discharging with a high accuracy. The water spout control device 20 according to some embodiments only has to acquire the image including the faucet spout 400 such that there is no necessity to dispose a sensor or a camera at the faucet spout port. Accordingly, it is possible to avoid a false detection that may occur due to water drops and the like from the faucet spout port.

According to the water spout control device 20 according to some embodiments, the control information outputter 210 controls to perform the water discharging if the first water spout condition is satisfied in the case in which the position of the target object 403 is determined, and the control information outputter 210 controls to perform the water discharging if the second water spout condition being stricter than the first water spout condition is satisfied in the case in which the position of the holding object 402 is determined. The first water spout condition, for example, in the case in which the threshold of the existence period when the holding object 402 remains in the region E2 in the water spout condition 4 is longer than the threshold of the existence period when the target object 403 remains in the region E1 in the water spout condition 3, refers to the water spout condition 3. The second water spout condition, for example, in the case in which the threshold of the existence period when the holding object 402 remains in the region E2 in the water spout condition 4 is longer than the threshold of the existence period when the target object 403 remains in the region E1 in the water spout condition 3, refers to the water spout condition 4. Accordingly, the water spout control device 20 may perform the water discharging in a stricter condition in the case in which the holding object is at the position slightly away from the faucet spout port D compared with the case in which the target object 403 is put out to the faucet spout port D, thus the water spout control device 20 may control the water discharging more accurately.

According to the water spout control device 20 according to some embodiments, the imaging target region is the region including the faucet spout 400. Accordingly, the imaging device 10 may capture the state of the target object 403 being put out to the faucet spout port D and the state of the holding object 402 remaining at the position slightly away from the faucet spout port D in the image.

According to the water spout control device 20 according to some embodiments, the region E2 is the region surrounding the region E1. Accordingly, in the case in which it is difficult to recognize the state of the target object 403 existing in the region E1, even if in the case in which the holding object 402 exists at a position difficult to be detected by the sensor disposed near the faucet spout port, such as the back side of the faucet spout port, the water spout control device 20 may detect that the holding object 402 is remaining in the region E2 so as to control the water discharging more accurately.

According to the water spout control device 20 according to some embodiments, the control information outputter 210 control the water discharging according to the period when the target object 403 remains in the region E1 including the positon of the faucet spout port D, or the period when the holding object 402 remains in the region E2. Accordingly, even if in the case in which it is not detected that the target object 403 is put out to the faucet spout port D for a predetermined period, the water spout control device 20 according to some embodiments may indirectly detect the target object 403 by detecting that the holding object 402 is remaining at the position slightly away from the faucet spout port D such that the water spout control device 20 may control the water discharging accurately. By setting the period capable of detecting that the target object 403 remains in the region E1 to be shorter than the period capable of detecting that the holding object 402 remains in the region E2, the control information outputter 210 may perform a two-step process of detecting the target object 403 at first, and then detecting the holding object 402 in the case in which the target object 403 is not detected so as to control the water discharging accurately.

According to the water spout control device 20, the control information outputter 210 controls to start the water discharging in the case in which the holding object 402 is moving in the region E2 at a velocity slower than a predetermined threshold velocity, or the holding object 402 is stopped in the region E2 for a predetermined period. Accordingly, the water spout control device 20 according to some embodiments does not perform the water discharging in the case in which the holding object 402 simply passes through the region E2. The water spout control device 20 may perform the water discharging in the case in which the holding object 402 holds the target object 403 and the holding object 402 performs the operation to make the target object 403 to receive the discharged water so as to control the water discharging accurately.

A water spout control system 1A according to some embodiments is different from some embodiments described above in that the water spout control system 1A detects a skeleton instead of detecting the holding object 402. Hereinafter, features different from some embodiments described above will be described, the configurations having the same or similar functions with respect to some embodiments described above will be designated as the same reference sign and the reductant description will be omitted.

Figure 5:
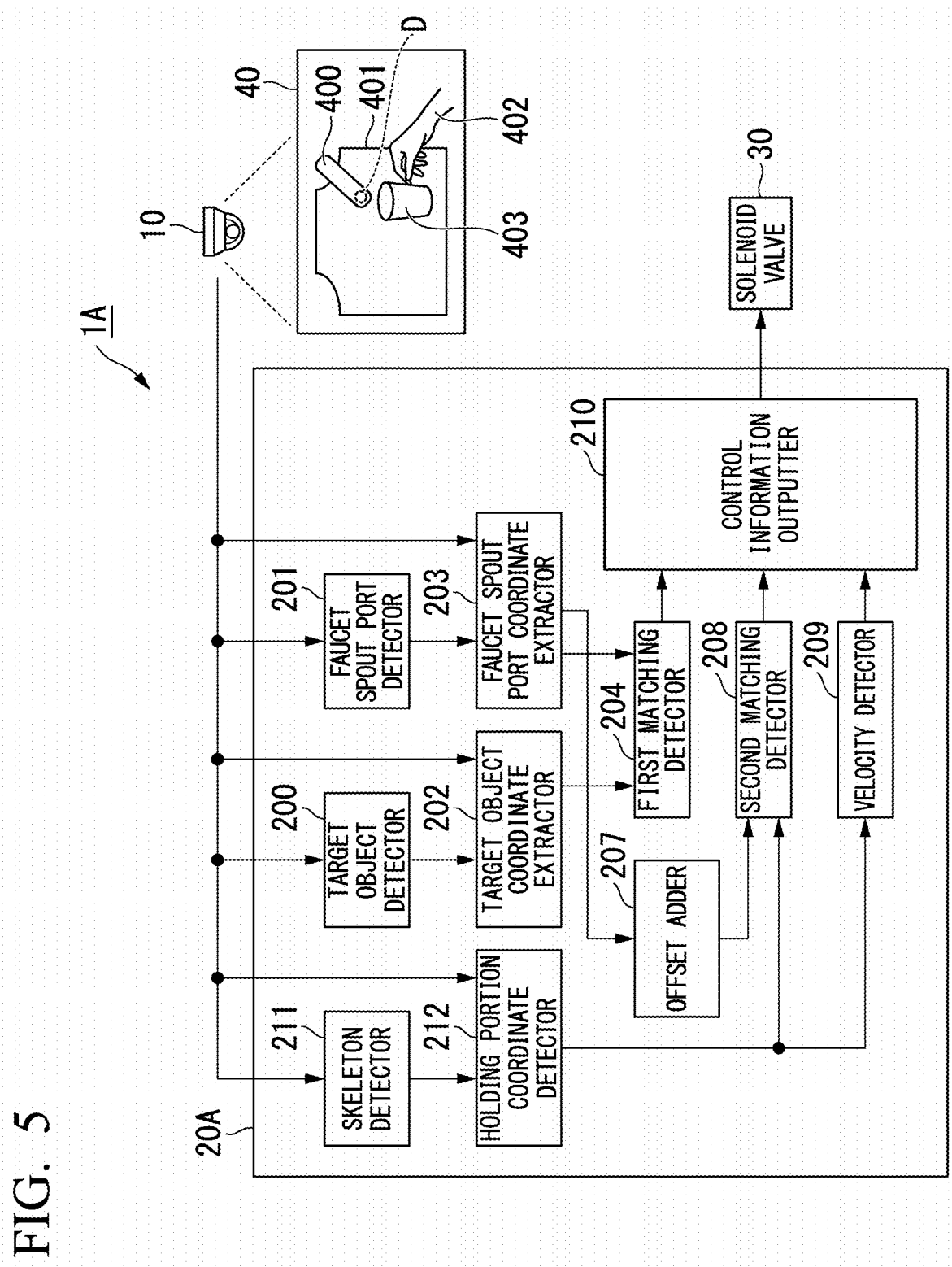
FIG. 5 is a block diagram showing a configuration example of a water spout control device 20A according to some embodiments.

FIG. 5 is a block diagram showing a configuration example of the water spout control system 1A according to some embodiments. For example, a water spout control device 20A of the water spout control system 1A has a skeleton detector 211, and a holding portion coordinate extractor 212. The skeleton detector 211 and the holding portion coordinate extractor 212 is an example of a "holding object detector".

The skeleton detector 211 detects actions of a human being captured in the image according to the image captured by the imaging device 10. For example, the skeleton detector 211 acquires information corresponding to the actions of the human by using a camera, i.e. an infrared camera and a sensor, i.e. a motion sensor. The skeleton detector 211 extracts joints of the human according to the information corresponding to the actions of the human that is acquired by using the infrared camera and the like, and the skeleton detector 211 detects the skeleton of the human by connecting the extracted joints in accordance with the skeleton structure of the human. The skeleton detector 211 outputs information corresponding to the actions and the skeleton of the detected human to the holding portion coordinate extractor 212.

The holding portion coordinate extractor 212 extracts positional coordinates of a portion of the human to hold the target object 403, i.e. a hand according to the information corresponding to the actions of the human and the skeleton detected by the skeleton detector 211. The portion to hold the target object 403 is an example of "the holding object".

The holding portion coordinate extractor 212 outputs the extracted positional coordinates to the second matching detector 208 and the velocity detector 209.

The second matching detector 208 determines whether the positional coordinates extracted by the holding portion coordinate extractor 212 and the position of region E2 as the offset area extracted by the offset adder 207 match with each other.

The velocity detector 209 detects a movement velocity of the holding portion according to the positional coordinates of the holding portion extracted by the holding portion coordinate extractor 212.

As described above, in the water spout control device 20A according to some embodiments, the skeleton detector 211 and the holding portion coordinate extractor 212 determine the position of the portion to hold the target object 403 by detecting the skeleton of the human in the image. Accordingly, the water spout control device 20A according to some embodiments may determine the position of the portion to hold the target object 403 by extracting the skeleton so as to be able to detect the holding object.

The whole or part of the process performed by the water spout control device 20 and water spout control device 20A according to some embodiments described above may be realized by a computer. In this case, a program for realizing such functions may be recorded in a computer-readable recording medium as a program, and the processing described above is performed when the program is read by the computer and executed by the computer. The "computer system" refers to a system including an operating system (OS) and hardware such as peripheral devices. The "computer-readable recording medium" refers to a removable medium such as a flexible disk, a magneto-optical disk, a read-only memory (ROM), and a compact disk read-only memory (CD-ROM), and a storage unit such as a hard disk disposed inside the computer system. Furthermore, in a case that the program is transferred through a network such as the internet and a communication line such as the telephone line, the "computer-readable recording medium" may refer to the communication line that is configured to maintain the program temporarily and dynamically, or the "computer-readable recording medium" may refer to the device configured to maintain the program for a certain period such as a volatile memory inside the computer system used as a server or a client. The program may be a program for realizing part of the functions described above, the program may be combined with the program recorded in the computer system to realize the functions, and the program may be realized by using a programmable logical device such as a field-programmable gate array and the like.

Although some embodiments of the present disclosure have been described above, the present disclosure is not limited to some embodiments and modifications thereof. Additions, omissions, substitutions and other changes in the structure are possible without departing from the spirit of the present disclosure. The present disclosure is not limited by the foregoing description and is limited only by the scope of the appended claims.

According to some embodiments described above, a water spout control device, a water spout control system, and a water spout control method can be provided to control water discharging from a faucet spout in a high accuracy.

What is claimed is:

1. A water spout control system, comprising:
   an imaging device configured to capture an image of an imaging target region including
   a faucet spout from a upward side of the faucet spout, and
   a water spout control device configured to acquire image information of the image captured by the imaging device,
   wherein the water spout control device further comprises:
   a target object detector configured to detect whether a target object as a detection target exists in a first detection region and to determine a position of the target object in a case in which the detection target exists in the first detection region according to an image information of a regional image in which the imaging target region including a plurality of detection regions are captured, wherein the regional image is generated by the imaging device capturing the imaging target region, and the first detection region comprises at least one detection region among the plurality of detection regions;
   a holding object detector configured to detect whether a holding object holding the detection target exists in a second detection region and to determine a position of the holding object in a case in which the holding object exists in the second detection region according to the image information, the second detection region being different from the first detection region among the plurality of detection regions; and
   a controller configured to control water discharging according to a detection result by the target object detector and a detection result by the holding object detector,
   wherein water spout conditions in the plurality of detection regions for controlling the water discharging from the faucet spout are different from each other.

2. The water spout control system of claim 1,
   wherein the controller controls the water discharging in a case in which the position of the target object is determined and a predetermined first water spout condition is satisfied, and
   the controller controls the water discharging in a case in which the position of the holding object is determined and a second water spout condition is satisfied, wherein a period from the holding object being detected until the water discharging starts of the second water spout condition is longer than a period from the target object being detected until the water discharging starts of the first water spout condition.

3. The water spout control system of claim 1, wherein the imaging target region is a region including the faucet spout.

4. The water spout control system of claim 1, wherein the second detection region is set to be around the first detection region.

5. A water spout control method, comprising:

detecting whether a target object as a detection target exists in a first detection region and determining a position of the target object in a case in which the target exists in the first detection region by a target object detector according to an image information of a regional image generated by an imaging device in which a plurality of detection regions are captured, by a target object detector, the first detection region being at least one region among the plurality of detection regions;

detecting whether a holding object holding the detection target exists in a second detection region and determining a position of the holding object in a case in which the holding object exists in the second detection region according to the image information by a holding object detector, the second detection region being different from the first detection region among the plurality of detection regions; and controlling water discharging according to a detection result by the target object detector and a detection result by the holding object detector by a controller, wherein the imaging device is configured to capture an image of an imaging target region including a faucet spout from a upward side of the faucet spout.

6. The water spout control system of claim 1, wherein the water spout condition in the first detection region for controlling the water discharging is different from the water spout condition in the second region.

* * * * *